United States Patent [19]
Aourane

[11] Patent Number: 6,058,368
[45] Date of Patent: May 2, 2000

[54] RELIABILITY GROWTH TOOL

[75] Inventor: Mehenna Aourane, Kanata, Canada

[73] Assignee: Nortel Networks Corporation, Montreal, Canada

[21] Appl. No.: 08/975,483

[22] Filed: Nov. 20, 1997

[51] Int. Cl.⁷ .................................................. G06F 17/60
[52] U.S. Cl. ..................... 705/7; 705/1; 702/34
[58] Field of Search .............................. 705/1, 7; 702/34, 702/81, 187

[56] References Cited

U.S. PATENT DOCUMENTS 5,282,150  1/1994  Yamada ................................... 364/554
5,465,321  11/1995  Smyth ....................................... 395/22

OTHER PUBLICATIONS

Daniel G. Frank; "A corollary to: Duane's postulate on reliability growth". IEEE, pp. 167–170, 1989.

*Primary Examiner*—Allen R. MacDonald
*Assistant Examiner*—Hani. M. Kazimi

[57] ABSTRACT

A method of determining growth and return rates in equipment includes the step of producing commissioning records and failure records. The commissioning records and the failure records are arranged in sets of records, the sets being in chronological order of in-service date. Each set of records is then addressed successively and a new record is produced between consecutive sets of records according to pre-defined conditions. Within each set of records, there is produced a natural logarithm of cumulative in-service time in hours value and a natural logarithm of cumulative percent failures per year value. Slope and intercept values of a best-fit curve applied to an X data set comprised of the natural logarithm of cumulative in-service time in hours values of the last records in each set and a Y-data set comprised of the natural logarithm cumulative percent failures per year fields of the last records in each set are then calculated, the slope value representing the growth rate of the equipment.

26 Claims, 17 Drawing Sheets

VTBM OD2-5  REL GROWTH PROGRAM
LAST UPDATE: 10/28/97 10:51

| | | | | LAST DATED ENTRY | | |
|---|---|---|---|---|---|---|
| | | | | TOTAL | 20-MAR-97 | |
| S/N | IN-SERVICE DATE | FAIL. DATE | UNITS SHIPPED | DATE | TOTAL UNITS SHIPPED | |
| A100BFFE3 | 11-MAR-95 | 28-FEB-96 | 1 | 29-SEP-95 | 1 | |
| A130BFFEE | 11-MAR-95 | 14-FEB-96 | 1 | 11-MAR-95 | 2 | |
| A140BC591 | 17-OCT-95 | 4-FEB-97 | 1 | 17-OCT-95 | 1 | |
| nt | | | | | | |
| A130C2A3A | 14-DEC-95 | 16-JUL-96 | 44 | 1-NOV-95 | 44 | |
| A1D0C3C88 | 15-DEC-95 | 15-APR-96 | 1 | 14-DEC-95 | 1 | |
| A120C2A31 | 21-DEC-95 | 15-JAN-97 | 1 | 15-DEC-95 | 1 | |
| A180C2A37 | 21-DEC-95 | 4-FEB-97 | 1 | | | |
| nt | | | 23 | 21-DEC-95 | 2 | |
| | 1-JAN-96 | | | 1-JAN-96 | 23 | |
| | 4-JAN-96 | | | 4-JAN-96 | 0 | |
| A160C82C8 | 15-JAN-96 | 3-APR-96 | 1 | 15-JAN-96 | 1 | |
| A1D0C746A | 16-JAN-96 | 15-APR-96 | 1 | 16-JAN-96 | 1 | |
| A1B0C82B0 | 26-JAN-96 | 9-MAY-96 | 1 | 26-JAN-96 | 1 | |

76 → A100BFFE3
74 → nt
32 → A1B0C82B0
36 → S/N
38 → IN-SERVICE DATE
40 → FAIL. DATE
42 → UNITS SHIPPED
44 → DATE
46 → TOTAL UNITS SHIPPED

FIG. 2A 6,058,368

RELIABILITY GROWTH TOOL

FIELD OF THE INVENTION

The invention relates to a method of tracking failures of equipment placed in service and determining reliability growth models to predict a return rate for the equipment.

BACKGROUND OF THE INVENTION

In determining quality assurance test figures for equipment, various methods exist for calculating growth rates and return rates. One such method has been proposed by Duane, J. T., Learning Curve Approach to Reliability Monitoring IEEE Transactions on Aerospace, Vol. 2, No. 2, 196, in which the relationship between failure rate and time is a straight line when plotted on log-log paper. This model is relatively easy to use, however, this model assumes that equipment is fixed immediately after a failure occurs, before further test time is accumulated. Such fixes are not normally achieved so quickly in practice.

In order to use the Duane model, data elements including failure history, serial number, failure symptoms, number of items under test, installed date and root cause analysis are gathered and analyzed. Analysis involves calculating cumulative in-service times (CIST) and cumulative percent failures per year and plotting these values to determine a slope and intercept, the slope and intercept being the growth rate and growth constant respectively. Knowledge of the growth rate and growth constant enable a return rate prediction to be made for a given shipping rate of the equipment.

The gathering of data elements can be a tedious operation and the calculation of cumulative in-service times and cumulative percent failures per year can also be tedious. What would be desirable therefore is a way to organize data elements in such a way that the calculation of cumulative in-service times (CIST) and cumulative percent failures per year is simplified for expediency.

SUMMARY OF THE INVENTION

In accordance with one aspect of the invention, there is provided a method of determining growth and return rates in equipment, the method including the steps of:

a) producing commissioning records having an equipment identifier field for identifying corresponding equipment placed in service, an in-service date field for indicating the date the equipment was placed in service and a number of units placed in service field for identifying the number of units of the equipment placed in service on the in-service date;

b) producing failure records having an equipment identifier field for identifying equipment failed, a failure date field for identifying a date on which the equipment failed, an in-service date field for identifying the date on which the equipment was placed in service and a number of units failed field for identifying the number of units of the equipment identified by the equipment identifier field which have failed;

c) arranging the commissioning records and the failure records such that the commissioning records and the failure records are arranged in sets of records, the sets being in chronological order of in-service date;

d) addressing each set of records successively and producing and adding a new record between consecutive sets of records when any record preceding a currently addressed set of records has a failure date between the in-service date of the currently addressed set and the in-service date of the next successive set, the new record including an in-service date field and a units failed field, the failure date of the any record preceding the currently addressed set of records being stored in the in-service date field of the new record and the contents of the units failed field of the any record preceding the currently addressed set of records being stored in the units failed field of the new record; and e) producing and associating with each set of records a total units shipped value;

f) producing and associating with each set of records a total units failed value;

g) producing and associating with each set of records a cumulative units-in-field value;

h) producing and associating with each set of records a cumulative units failed value;

i) producing and associating with each set of records a cumulative in-service time in days value;

j) producing and associating with each set of records a cumulative in-service time in hours value;

k) producing and associating with each set of records a natural logarithm of cumulative in-service time in hours value;

l) producing and associating with each set of records a cumulative percent failures per year value;

m) producing and associating with each set of records a natural logarithm of cumulative percent failures per year value;

n) calculating slope and intercept values of a best-fit curve applied to an X data set comprised of the natural logarithm of cumulative in-service time in hours values of the last records in each set and a Y-data set comprised of the natural logarithm cumulative percent failures per year fields of the last records in each set, the slope value representing the growth rate of the equipment.

Preferably, the method includes the step of producing and associating a total units shipped value includes the step of for each set of records, adding the contents of the number of units placed in service fields of each record to produce the total units shipped value and appending to a last record in the each set, a total units shipped field and storing the total units shipped value in the total units shipped field.

Preferably, the method includes the step of producing a total units shipped value includes the step of for each set of records, adding the contents of the number of units failed fields of each record in the set to produce the total units failed value and appending to a last record in the each set, a total units failed field and storing in the total units failed field the total units failed value.

Preferably, the method includes the step of producing and associating a cumulative units-in-field value includes the step of appending a cumulative units-in-field field to each of the last records in each of the sets and subtracting the contents of the number of units failed field from the cumulative units-in-field field of the last record in an immediately preceding set, and adding the number of units placed in service to produce a cumulative units in service value for a currently addressed last record in a set.

Preferably, the method includes the step of producing and associating a cumulative units failed value includes the step of appending a cumulative units failed field to each of the last records in each of the sets and adding the contents of the cumulative units failed field of the last record in an immediately preceding set to the contents of the number of units failed field to produce the cumulative units in service value and storing the cumulative units in service value in the cumulative units failed field of a currently addressed last record in a set.

Preferably, the method includes the step of producing and associating a cumulative in-service time in days value includes the step of for the last record in each set, appending a cumulative in-service time in days field and storing in the cumulative in-service time in days field the cumulative in service time in days value calculated as the sum of the product of the number of days between the contents of the in-service date field of the last record of a currently addressed set of records and the contents of the in-service date field of the last record in an immediately previously addressed set and the contents of the cumulative units in service field and the contents of the cumulative in-service time in days field of the last record of the immediately previously addressed set of records.

Preferably, the method includes the step of producing and associating a cumulative in-service time in hours value includes the step of for the last record in each set, appending a cumulative in-service time in hours field, the contents of which are calculated as the product of the contents of the cumulative in-service time in days field of the same record and the number of hours in a day.

Preferably, the method includes the step of producing and associating a natural logarithm of cumulative in-service time in hours value includes the step of for the last record in each set, appending a natural logarithm of cumulative service time in hours field, the contents of which are calculated as the natural logarithm of the contents of the cumulative in-service time in hours field.

Preferably, the method includes the step of producing and associating a cumulative percent failures per year value includes the step of for the last record in each set, appending a cumulative percent failures per year field, the contents of which are calculated as the quotient of the contents of the cumulative units failed field and the contents of the cumulative in-service time in hours field multiplied by the number of hours per year and further multiplied by 100.

Preferably, the method includes the step of producing and associating a natural logarithm of cumulative percent failures per year includes the step of for the last record in each set, appending a natural logarithm of cumulative percent failures per year field, the contents of which are calculated as the natural logarithm of the contents of the cumulative percent failures per year field.

Preferably, the method includes the step of employing the growth rate value in a growth rate model to predict return rates of the equipment.

It is desirable that the method include the step of appending an include field to the last record in each set, the include field being operable to store a pre-defined value indicating whether or not the last record is to be included in the calculation of a best fit curve.

It is desirable that the method include the step of calculating upper and lower confidence values for natural logarithm of cumulative percent failures per year values and calculating respective slope and intercept values of best-fit curves applied to the upper and lower confidence values for natural logarithm of cumulative percent failures per year to produce upper and lower confidence growth rate values respectively.

In accordance with another aspect of the invention, there is provided a method of determining growth and return rates in equipment. The method includes the steps of:

a) producing commissioning records having an equipment identifier field for identifying corresponding equipment placed in service, an in-service date field for indicating the date the equipment was placed in service and a number of units placed in service field for identifying the number of units of the equipment placed in service on the in-service date;

b) producing failure records having an equipment identifier field for identifying equipment failed, a failure date field for identifying a date on which the equipment failed, an in-service date field for identifying the date on which the equipment was placed in service and a number of units failed field for identifying the number of units of the equipment identified by the equipment identifier field which have failed;

c) arranging the commissioning records and the failure records such that the commissioning records and the failure records are arranged in sets of records, the sets being in chronological order of in-service date;

d) addressing each set of records successively and producing and adding a new record between consecutive sets of records when any record preceding a currently addressed set of records has a failure date between the in-service date of the currently addressed set and the in-service date of the next successive set, the new record including an in-service date field and a units failed field, the failure date of the any record preceding the currently addressed set of records being stored in the in-service date field of the new record and the contents of the units failed field of the any record preceding the currently addressed set of records being stored in the units failed field of the new record; and e) for each set of records, adding the contents of the number of units placed in service fields of each record to produce a total units shipped value and appending to a last record in the each set, a total units shipped field and storing the total units shipped value in the total units shipped field;

f) for each set of records, adding the contents of the number of units failed fields of each record in the set to produce a total units failed value and appending to a last record in the each set, a total units failed field and storing in the total units failed field the total units failed value;

g) appending a cumulative units-in-field field to each of the last records in each of the sets and subtracting the contents of the number of units failed field from the cumulative units-in-field field of the last record in an immediately preceding set, and adding the number of units placed in service to produce a cumulative units in service value for a currently addressed last record in a set;

h) appending a cumulative units failed field to each of the last records in each of the sets and adding the contents of the cumulative units failed field of the last record in an immediately preceding set to the contents of the number of units failed field to produce a cumulative units failed value and storing the cumulative units failed value in the cumulative units failed field of a currently addressed last record in a set;

i) for the last record in each set, appending a cumulative in-service time in days field and storing in the cumulative in-service time in days field a cumulative in-service time in days value calculated as the sum of the product of the number of days between the contents of the in-service date field of the last record of a currently addressed set of records and the contents of the in-service date field of the last record in an immediately previously addressed set and the contents of the cumulative units in service field and the contents of the cumulative in-service time in days field of the last record of the immediately previously addressed set of records;

j) for the last record in each set, appending a cumulative in-service time in hours field, the contents of which are calculated as the product of the contents of the cumulative in-service time in days field of the same record and the number of hours in a day;

k) for the last record in each set, appending a natural logarithm of cumulative service time in hours field, the contents of which are calculated as the natural logarithm of the contents of the cumulative in-service time in hours field;

l) for the last record in each set, appending a cumulative percent failures per year field, the contents of which are calculated as the quotient of the contents of the cumulative units failed field and the contents of the cumulative in-service time in hours field, multiplied by the number of hours per year and further multiplied by 100;

m) for the last record in each set, appending a natural logarithm of cumulative percent failures per year field, the contents of which are calculated as the natural logarithm of the contents of the cumulative percent failures per year field;

n) calculating slope and intercept values of a best-fit curve applied to an X data set comprised of the contents of the natural logarithm of cumulative in-service time in hours fields of the last records in each set and a Y-data set comprised of the contents of the natural logarithm of cumulative percent failures per year fields of the last records in each set, the slope value representing the growth rate of the equipment.

Preferably, the method further includes the step of employing the growth rate value in a growth rate model to predict return rates of the equipment.

It is desirable that the method include the step of appending an include field to the last record in each set, the include field being operable to store a pre-defined value indicating whether or not the last record is to be included in the calculation of a best fit curve.

It is desirable that the method include the step of calculating upper and lower confidence values for natural logarithm of cumulative percent failures per year values and calculating respective slope and intercept values of best-fit curves applied to the upper and lower confidence values for natural logarithm of cumulative percent failures per year to produce upper and lower confidence growth rate values respectively.

It is desirable that the method include the step of employing the upper and lower growth rate values in a growth rate model to predict upper and lower return rates of the equipment.

BRIEF DESCRIPTION OF THE DRAWINGS

In drawings which illustrate embodiments of the invention.

DETAILED DESCRIPTION

FIG. 1

Figure 1:
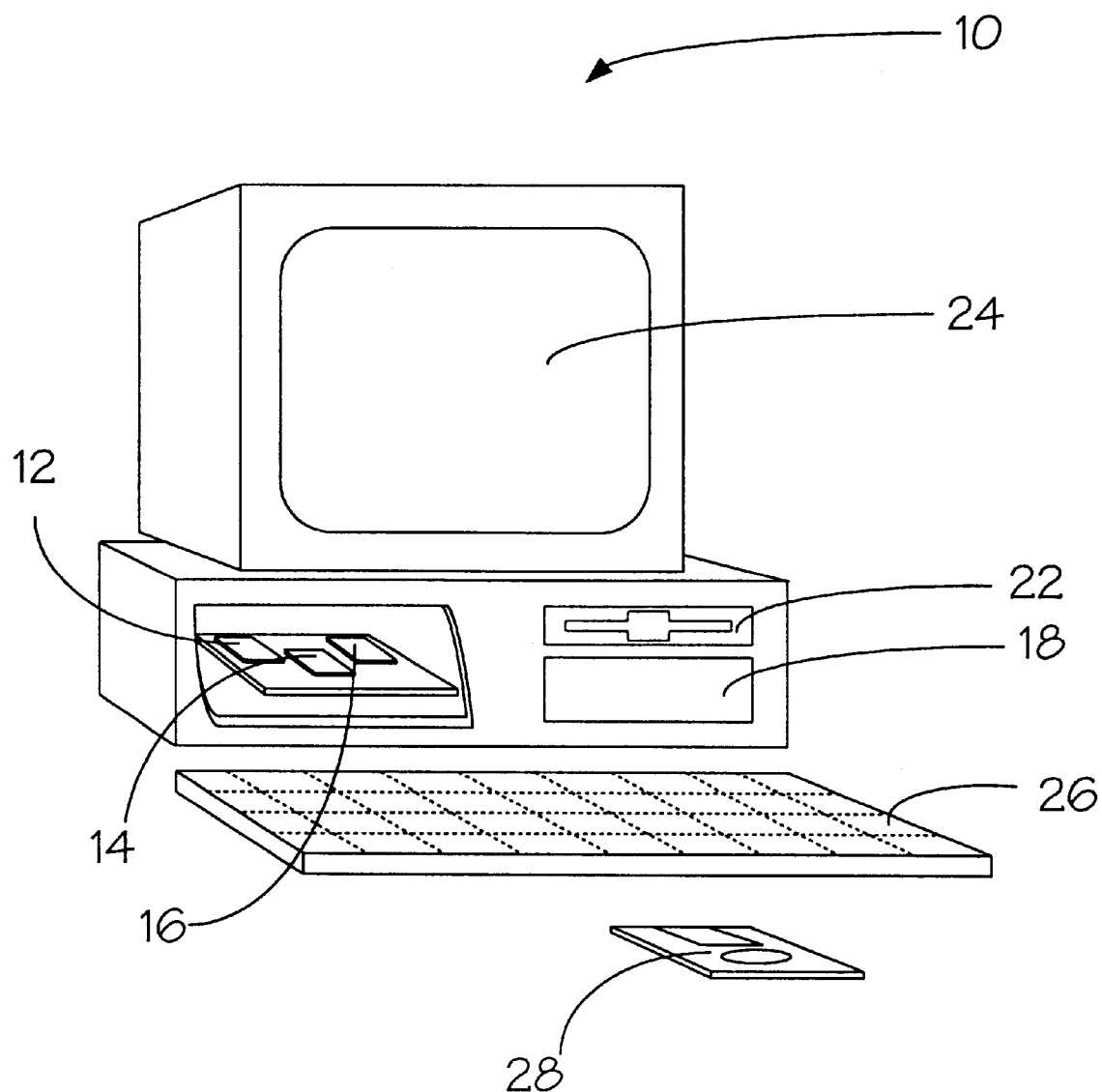
FIG. 1 is an apparatus for providing reliability growth information, according to a first embodiment of the invention.

Referring to FIG. 1, an apparatus for providing reliability growth information, according to a first embodiment of the invention, is shown generally at 10. The apparatus includes a computer having a processor 12 operable to communicate with Read Only Memory (ROM) 14, Random Access Memory (RAM) 16, a hard disk drive 18, a floppy disk drive 22, a display 24 and a keyboard 26. In this embodiment, a copy of an EXCEL(TM) 5.0 spreadsheet program is stored on the hard disk drive 18 and is configured to run on the processor 12 in the conventional manner described in the EXCEL 5.0 User's Manual, incorporated herein by reference.

A floppy disk 28, readable by the floppy disk drive 22, is configured to store a reliability growth tool file comprised of program instructions which are operable to interact with the EXCEL spreadsheet program to direct the processor 12 to perform various functions to keep track of units involved in a reliability growth test, to calculate graphical data of reliability growth, to produce graphs of reliability growth, to derive best-fit curves of graphs of reliability growth and to produce graphs of return rate versus time to enable prediction of reliability.

In order to use the various functions, the EXCEL program is opened to present a spreadsheet work area on the display 24.

FIG. 2

Figure 2B:
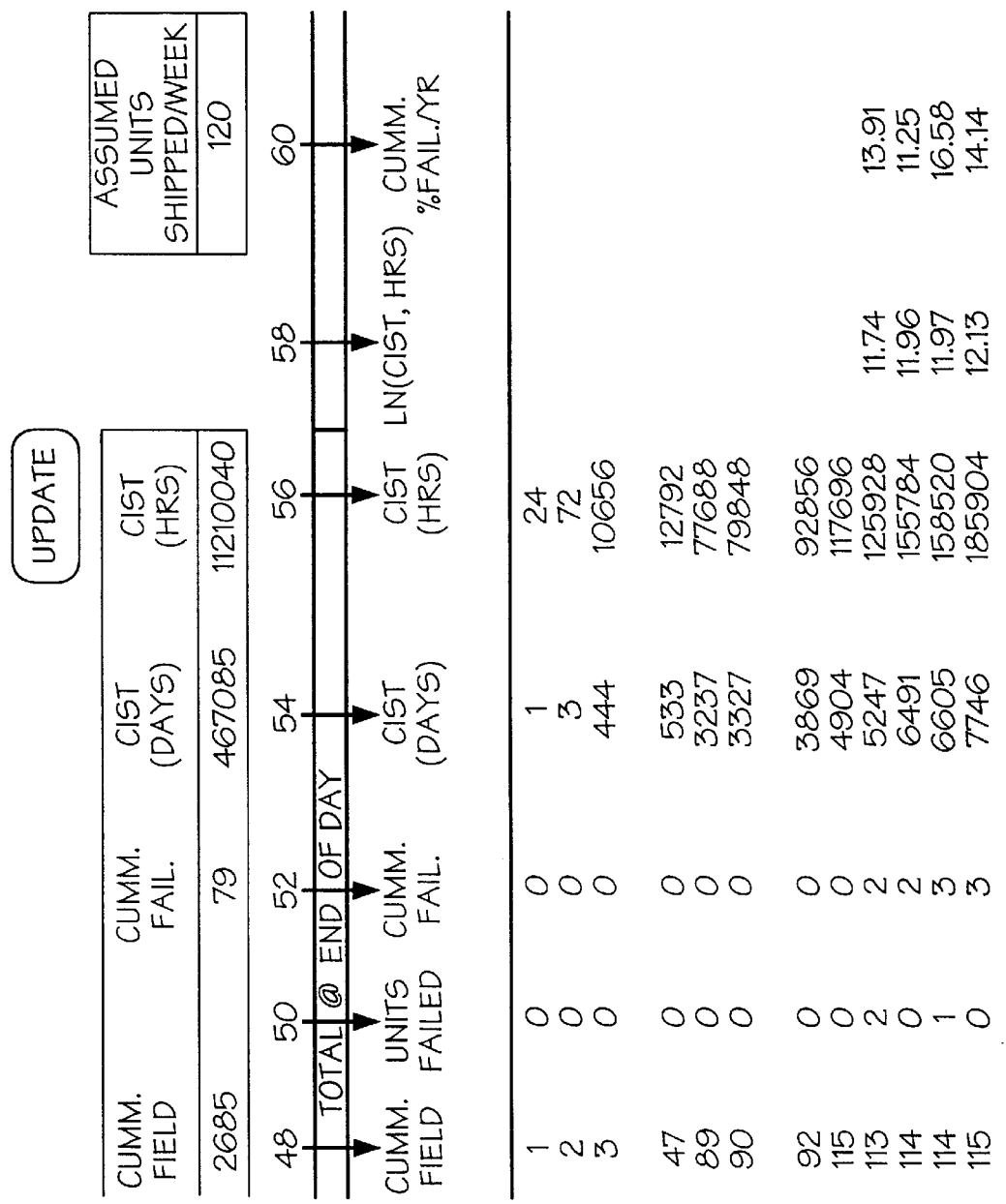
FIGS. 2a and 2b depict a spreadsheet work area, according to the first embodiment of the invention.
Figure 2C:
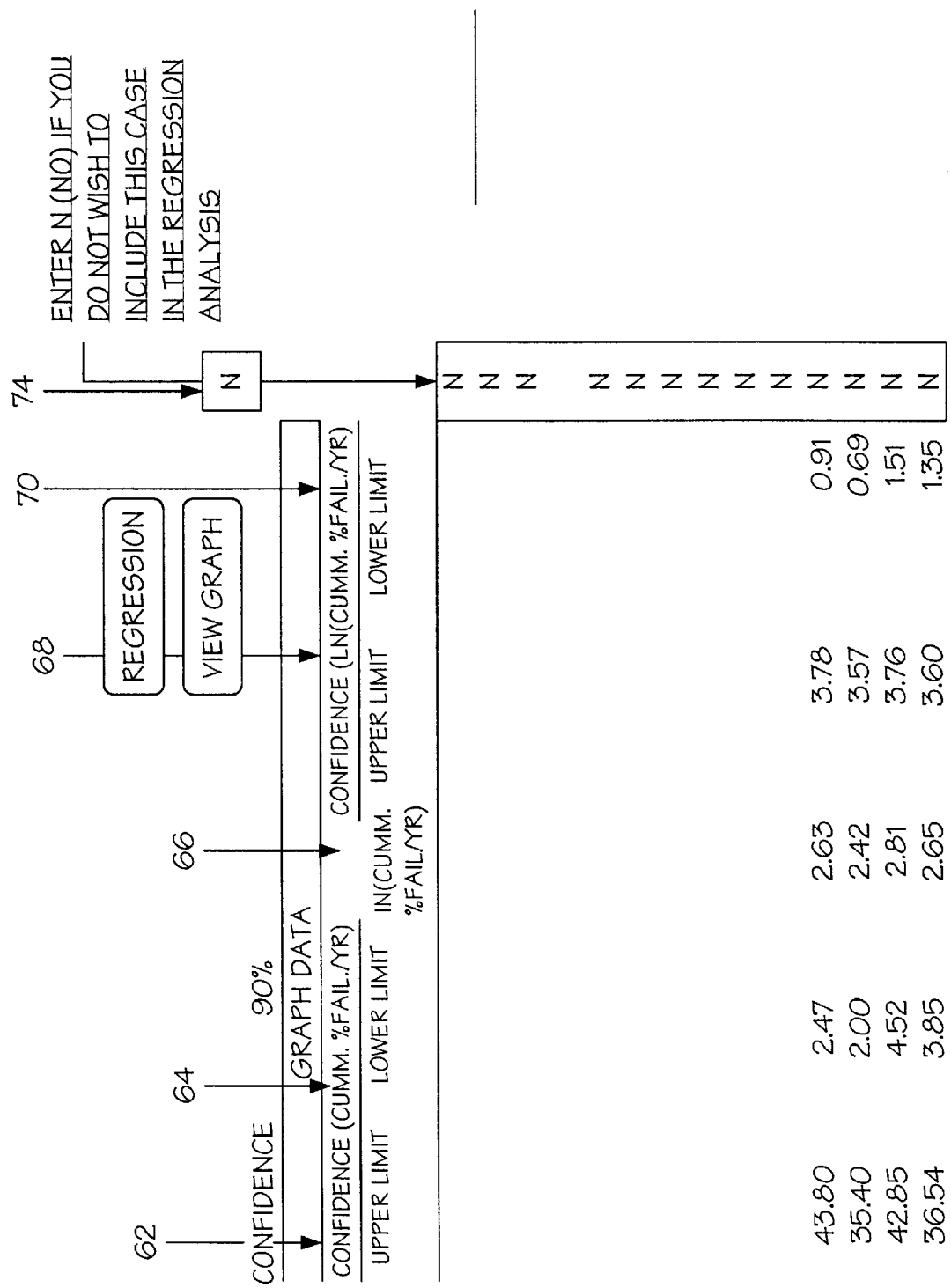

Referring to FIG. 2, the spreadsheet 35 is configured to include a plurality of cells arranged in a matrix having a plurality of columns 30 and rows 32.

Each row 32 is associated with a respective component or batch of components which have either been placed in service or which have failed. Each row therefore relates to a respective record associated with a respective component or batch of components. Each record has a plurality of fields or cells for storing respective reliability data parameters. These fields include a serial number field 36, an in-service date field 38, a fail date field 40, a units shipped field 42, a date field 44, a total units shipped field 46, a cumulative units-in-field field 48, a number of units failed field 50, a cumulative units failed field 52, a cumulative in-service time (CIST) in days field 54, a (CIST) in hours field 56, a ln(CIST, hrs) field 58, a (cum%fail/yr) field 60, a confidence (cumm%fail/yr) upper limit field 62, a confidence (cumm%fail/yr) lower limit field 64, a ln(cum%fail/yr) field 66, a confidence ln(cum%fail/yr)upper limit field 68, a confidence ln(cum%fail/yr)lower limit field 70 and an include field 72.

User-Entry Interface

The spreadsheet has a user-entry interface (not shown) for accepting information relating to serial number, in-service date, number of units placed in service, fail date and number of units failed. The interface produces records in the spreadsheet 35 by storing the above indicated information in corresponding fields of the spreadsheet. The records include commissioning records, and failure records. Commissioning records are entered into the spreadsheet 35 on initial commissioning of a unit. Failure records are entered into the spreadsheet on failure of a unit or units. Commissioning records and failure records may alternatively be entered directly onto the spreadsheet by the user by directly accessing cells associated with a record.

Commissioning Records

Commissioning records are created upon entry of a date identifying when associated units are placed in service and a value representing the number of units placed in service. An example of a commissioning record is shown generally at 74. The user-entry interface produces a commissioning record by appending to any existing records a commissioning record in which the serial number field 36 is loaded with a code, which in this embodiment is "nt", the in-service date field 38 is loaded with a representation of the date identifying when the associated units were placed in service, and the number of units shipped field 42 is loaded with a value representing the number of units placed in service as of midnight on the date identified by the contents of the in-service date field 38. The remaining fields in the row are left blank. Commissioning records may be added anywhere on the spreadsheet 35 at any time.

Failure Records

When a unit fails, the user chooses to create a failure record and the user entry interface enters a serial number of an associated failed unit or other identification of the failed unit, a date identifying when the associated units were placed in service and a date identifying when the associated unit failed. The interface produces a failure record by appending to the spreadsheet 35 a failure record in which the serial number field 36 is loaded with the serial number of an associated failed unit or other identification of the failed unit, the in-service date field 38 is loaded with a representation of the date identifying when the associated unit was placed in service and the fail date field 40 is loaded with a date identifying when the associated unit failed. An example of a failure record is shown at generally at 76.

Macro Selection Interface

The spreadsheet further includes a macro selection interface (not shown) for accepting input from a user and for initiating the execution of either a format macro or a return rate macro.

Format Macro

Figure 3:
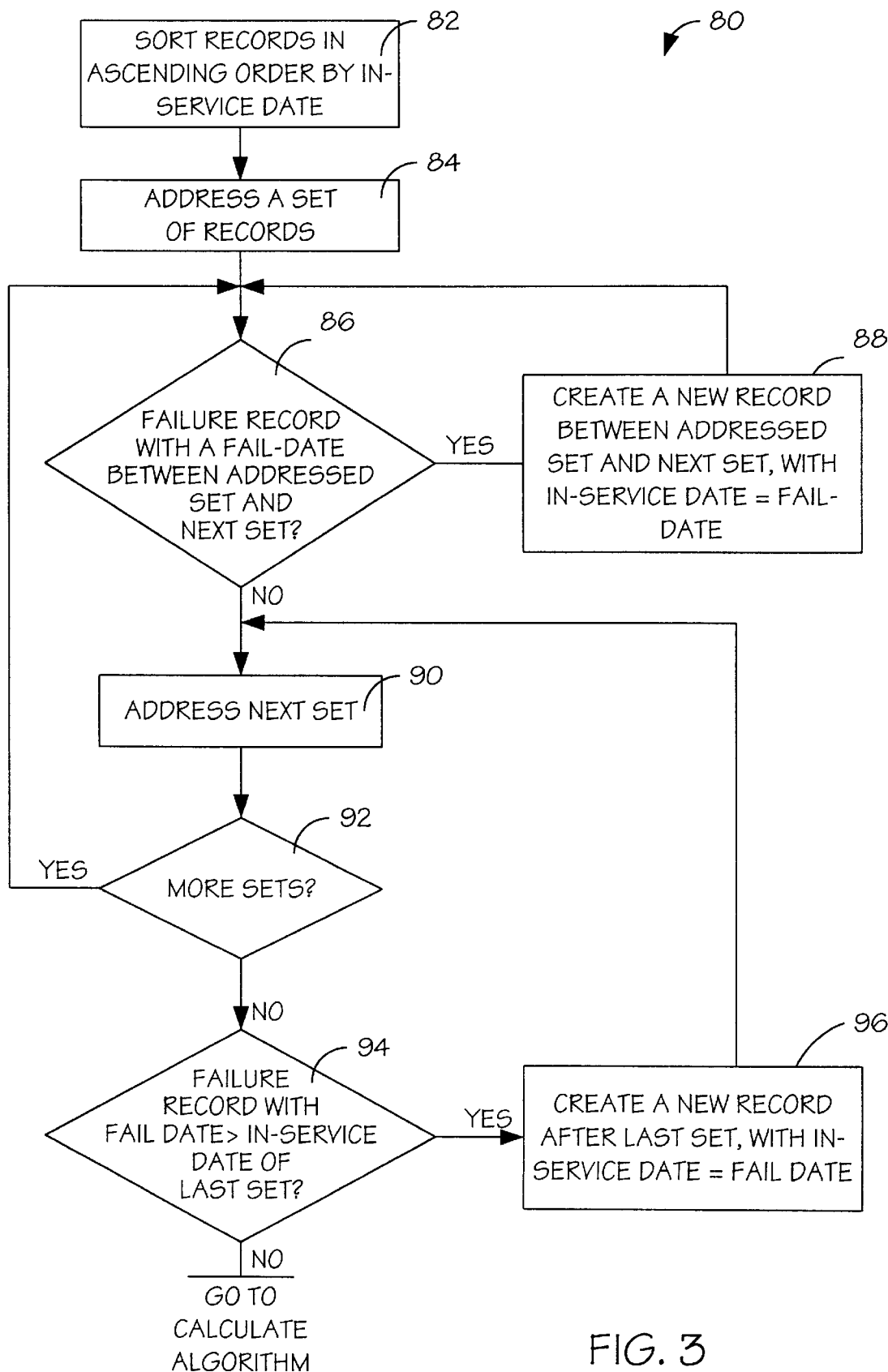
FIG. 3 is a flowchart depicting a format algorithm, according to the first embodiment of the invention.

Referring to FIG. 3, the format macro directs the processor 12 of FIG. 1 to execute instructions according to a format algorithm shown generally at 80. The format algorithm begins with block 82 which directs the processor to sort all records in the spreadsheet 35 in ascending order of in-service dates to produce a sorted list such that records having the same in-service date appear adjacent each other in the list. Thus, each in-service date is associated with a respective set of records. In other words, each set has a common in-service date.

Each set includes at least one record which is positioned in the sorted list immediately prior to a next successive set associated with a later date, in the sorted list. Where a set includes more than one record, there will be a last record in the set, which is positioned immediately prior to the next successive set in the sorted list. In the case of the last set in the list, the last record will be the last record in the sorted list. In any event, each set has a last record and where there is only one record in the set, such one record is the last record.

After producing the sorted list, block 84 directs the processor to address a first set of records in the list. Block 86 then directs the processor to review the fail date fields of all records preceding the addressed record to determine whether or not there is a record with a fail date between the in-service date of the addressed set and the in-service date of the next following set. If there is such a record, block 88 directs the processor to create a new record between the addressed set and the next following set, the new record having an in-service date equal to the fail date of the record located during block 86.

After creating the new record, the processor is directed back to block 86 to locate any further failure records with a fail date between the in-service date of the addressed set and the in-service date of the next following set. If no such failure records are found, block 90 directs the processor to address the next successive set in the list.

Block 92 then directs the processor to determine whether or not there are any more sets after the currently addressed set and, if so, the processor is directed back to block 86 whereupon the process of locating a failure record and creating a new record is repeated, as appropriate. If at block 92, the processor determines that there are no following sets of records, block 94 directs the processor to review the previous records to determine whether or not any has a fail date later than the in-service date of the last set. If so, block 96 directs the processor to create a new record after the last set, the new record having an in-service date equal to the fail date of the record located at block 94.

The processor is then directed back to block 90 to address the next set and the functions of block 92, 94 and 96 are repeated until no further failure records with a fail date later than the in-service date of the last set are located. When this condition occurs, the format algorithm is completed and the processor is directed to the calculation algorithm shown in FIG. 4a.

Calculation Algorithm

Figure 4A:
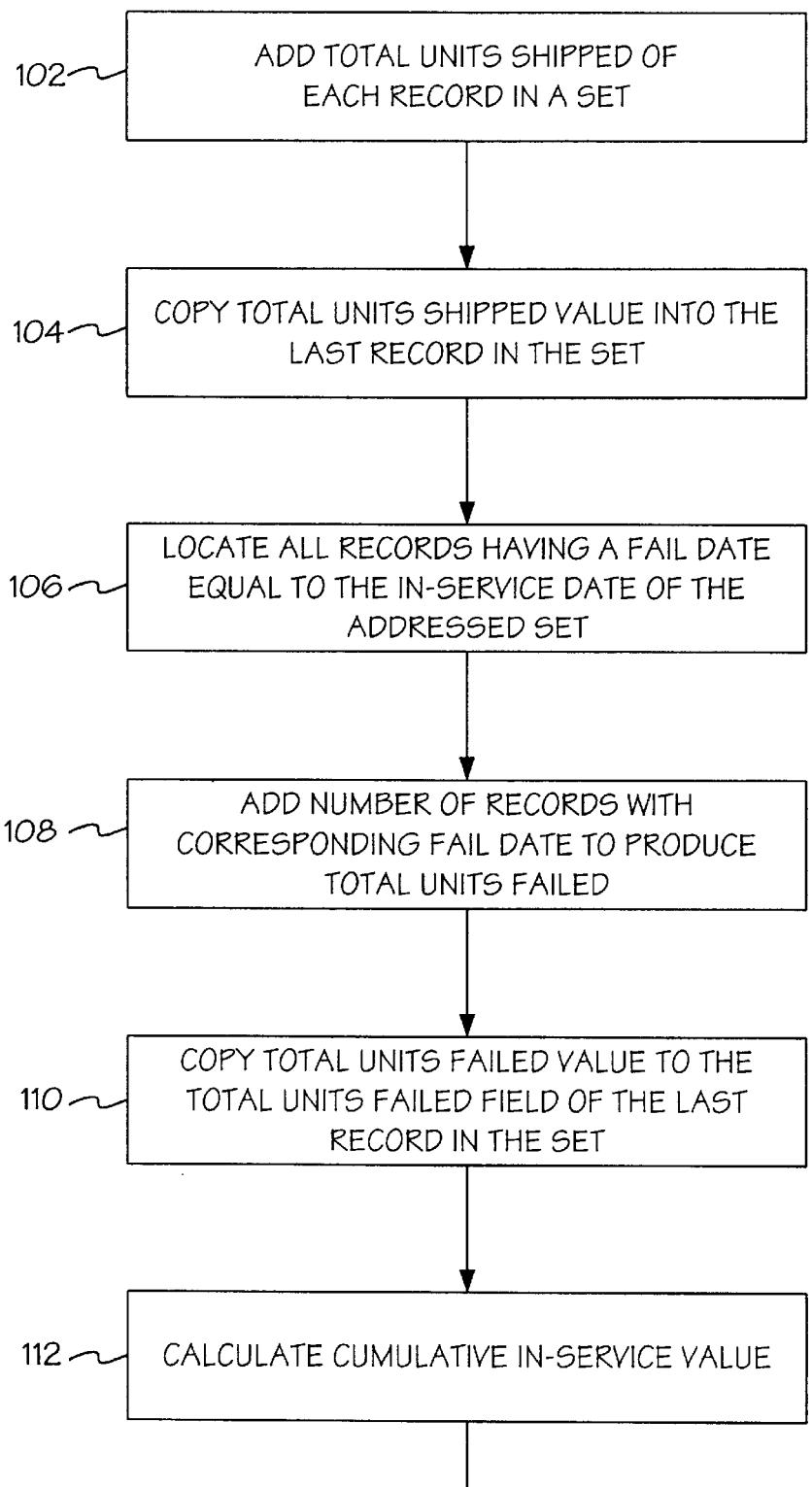
FIGS. 4a and 4b form a flowchart depicting a calculation algorithm, according to the first embodiment of the invention.
Figure 4B:
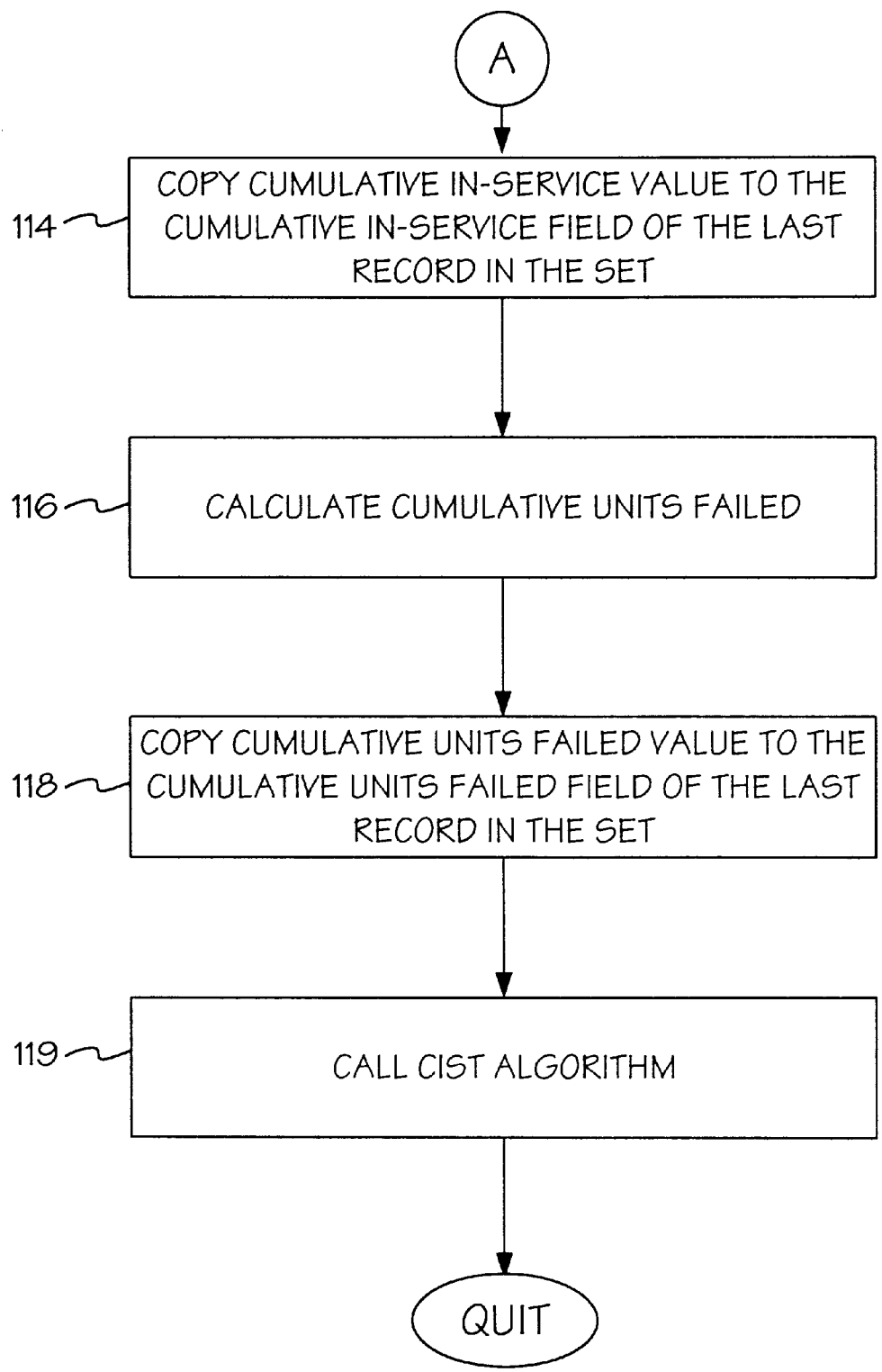

Referring to FIGS. 4a and 4b, the calculation macro directs the computer to execute instructions according to a calculation algorithm shown generally at 100. The calculation algorithm begins with block 102 which directs the computer to address each set of records and for each set, add the contents of the units shipped fields 42 of each of the records in the set to produce a total units shipped value. Block 104 then directs the computer to load the total units shipped value into the total units shipped field 46 of the last record in the set. Then, while a particular set is being addressed, block 106 directs the computer to locate all records, in the sorted list, having a fail date equal to the in-service date associated with the addressed set. Block 108 then directs the computer to count the number of records located, to produce a total units failed value. Block 110 then directs the computer to load the total units failed value into the number of units failed field 50 of the last record in the addressed set.

Block 112 then directs the computer to address the last record in the set, and subtract the contents of the number of units failed field 50 from the contents of the total units shipped field 46 and add the contents of the cumulative units-in-field field 48 of the last record in the immediately preceding set, to produce a cumulative units-in-field value representing the cumulative number of units in service.

Referring to FIG. 4b, block 114 directs the computer to store the cumulative units-in-field value in the cumulative units-in-field field 48 of the last record in the set.

In addition, while the last record in the set is being addressed, block 116 directs the computer to add the contents of the number of units failed field 50 to the contents of the cumulative units failed field 52 of the last record of the immediately preceding set to produce a cumulative units failed value. Block 118 directs the processor to store the cumulative units failed value in the cumulative units failed field 52 of the last record of the addressed set. Block 119 then directs the computer to the cumulative in-service time algorithm.

Cumulative In-Service Time Algorithm

Figure 5A:
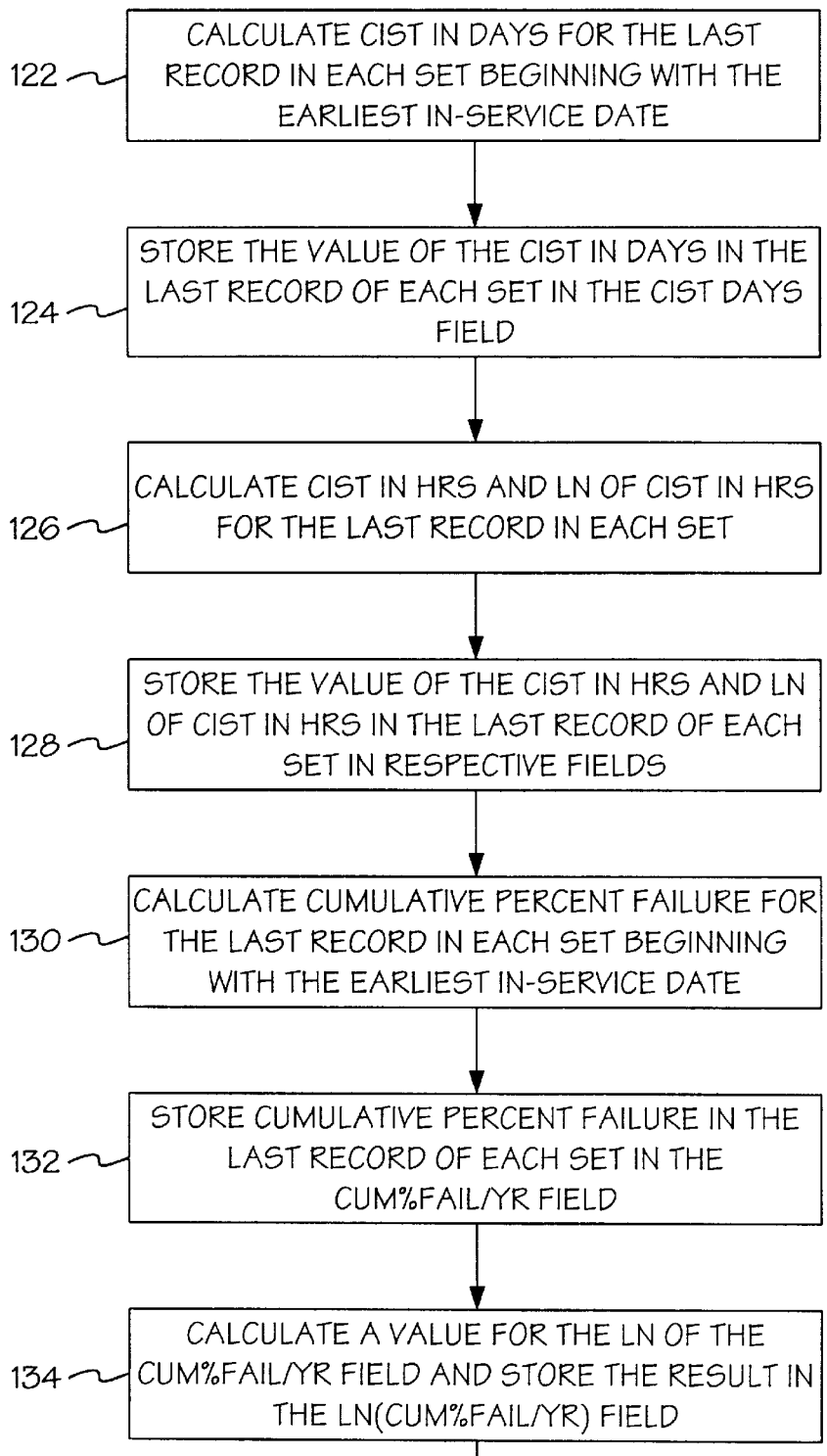
FIGS. 5a and 5b form a flowchart depicting a cumulative in-service time algorithm, according to the first embodiment of the invention.
Figure 5B:
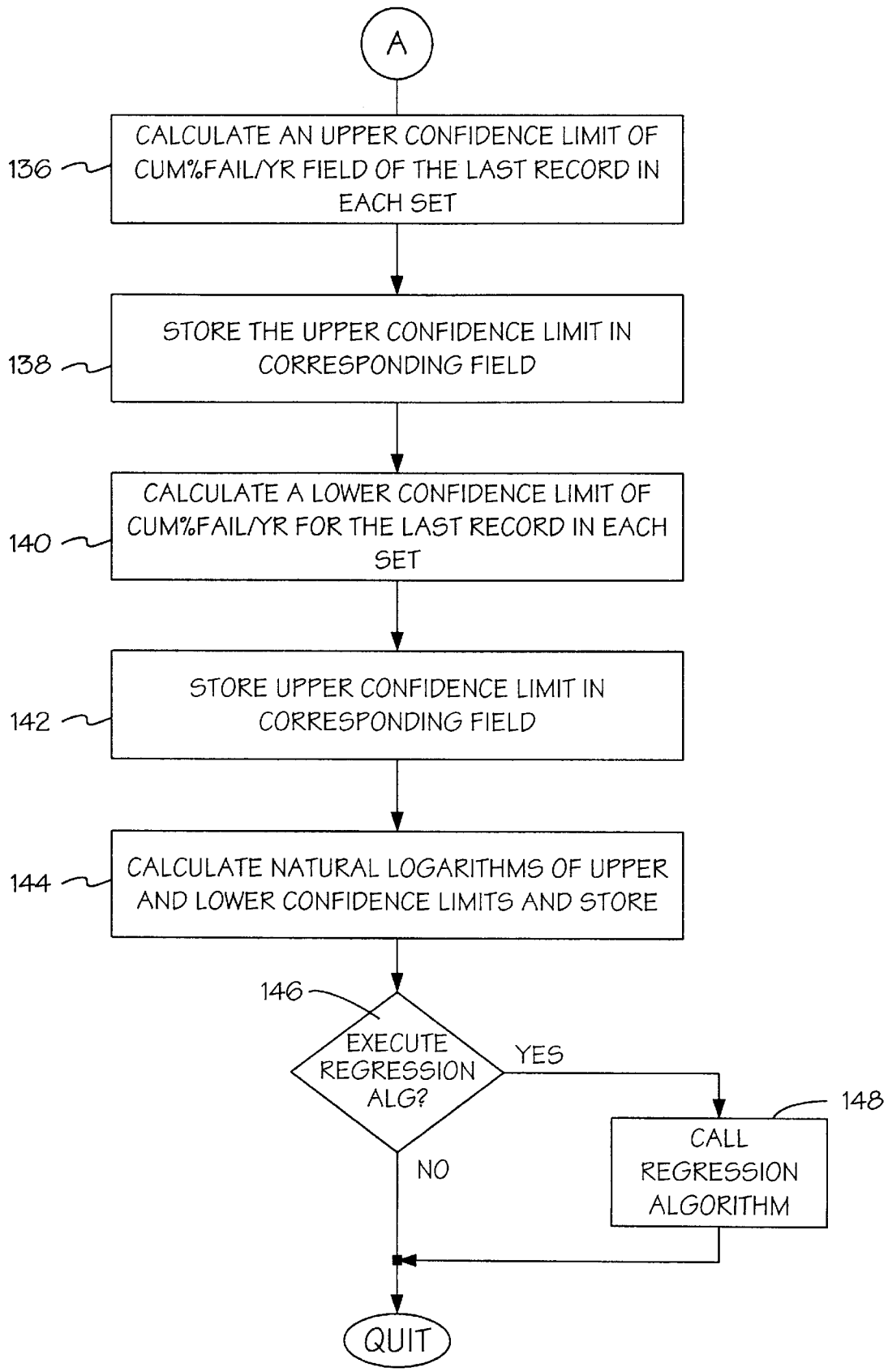

Referring to FIGS. 5a and 5b, the cumulative in-service time (CIST) macro directs the computer to execute instructions according to a CIST algorithm shown generally at 120. The cumulative in-service time algorithm begins with block 122 which directs the computer to address the last record in each set, and then to determine the number of days between the in-service date associated with the addressed set and the in-service date associated with the previous set and to multiply the number of days by the contents of the cumulative units-in-field field 48 of the last record in the previous set, and to add the contents of the cumulative in-service time in days field 54 and to add the contents of the total units shipped field 46 of the addressed set and to subtract the contents of the number of units failed field 50 of the addressed set to produce a new cumulative in-service time in days value. Block 124 then directs the computer to store the new cumulative in-service time in days value in the cumulative in-service time in days field 54 of the last record in the addressed set. The cumulative in-service time in days fields 54 are thus loaded with values identifying the cumulative number of days units have been in service as of midnight on the corresponding in-service date.

Block 126 then directs the computer to calculate, for each set of records, a corresponding cumulative in-service time in hours and a natural logarithm of the cumulative in-service time in hours. Block 128 then directs the computer to store these values in fields by the same names, in the last record of each respective set. The cumulative in-service time in hours fields 56 and the natural logarithm of the cumulative in-service time in hours fields 58 are thus loaded with values identifying the cumulative number of hours units have been in service as of midnight on the corresponding in-service date.

Block 130 then directs the processor to calculate for each set of records, a corresponding cumulative percent failure value by finding the quotient of the contents of the cumulative units failed field 52 and the contents of the cumulative in-service time in hours field 56, multiplying by the number of hours in a year and expressing the result as a percentage. Block 132 then directs the computer to store the percentage so calculated in the (cum%fail/yr) field 60 of the last record in each respective set. Thus, the (cum%fail/yr) fields 60 are loaded with values which identify the cumulative percent failures per year at the date of each corresponding set.

Block 134 then directs the computer to take the natural logarithm of the cumulative percent failure value calculated in block 130 and store the calculated value in the ln(cum%fail/yr) field 66 of the last record in the set.

Block 136 then directs the computer to calculate an upper confidence limit of the (cum%fail/yr) according to the relation:

$$UC = \frac{\chi^2_{\alpha/2}; 2 \cdot CF + 2}{2 \cdot CIST}$$

Where:
α=1−confidence interval
CF=Cumulative Failures
CIST=Cumulative In-service Time Block 138 then directs the computer to store in the (cum%fail/yr) upper limit field 62 the cumulative percent failures/year upper confidence limit so calculated.

Block 140 then directs the computer to calculate a lower confidence limit of the (cum%fail/yr) according to the relation:

Block 142 then directs the computer to store in the confidence (cum%fail/yr) lower limit field 64 the (cum%fail/yr) limit so calculated.

$$LC = \frac{\chi^2_{1-\alpha/2}; 2 \cdot CF}{2 \cdot CIST}$$

Block 144 then directs the computer to calculate the natural logarithm of the upper and lower confidence limits calculated in block 136 & 142 and to store the respective values so calculated in the confidence (ln cum%fail/yr)upper limit field 68 and the confidence (ln cum%fail/yr)lower limit field 70 respectively.

Block 146 directs the computer to create and display a "regression" button icon on the spreadsheet. If the "regression" button icon is actuated by the user, the computer is directed to block 148 which directs the computer to execute the regression algorithm. Otherwise, the CIST algorithm is ended.

Regression Algorithm

Figure 6A:
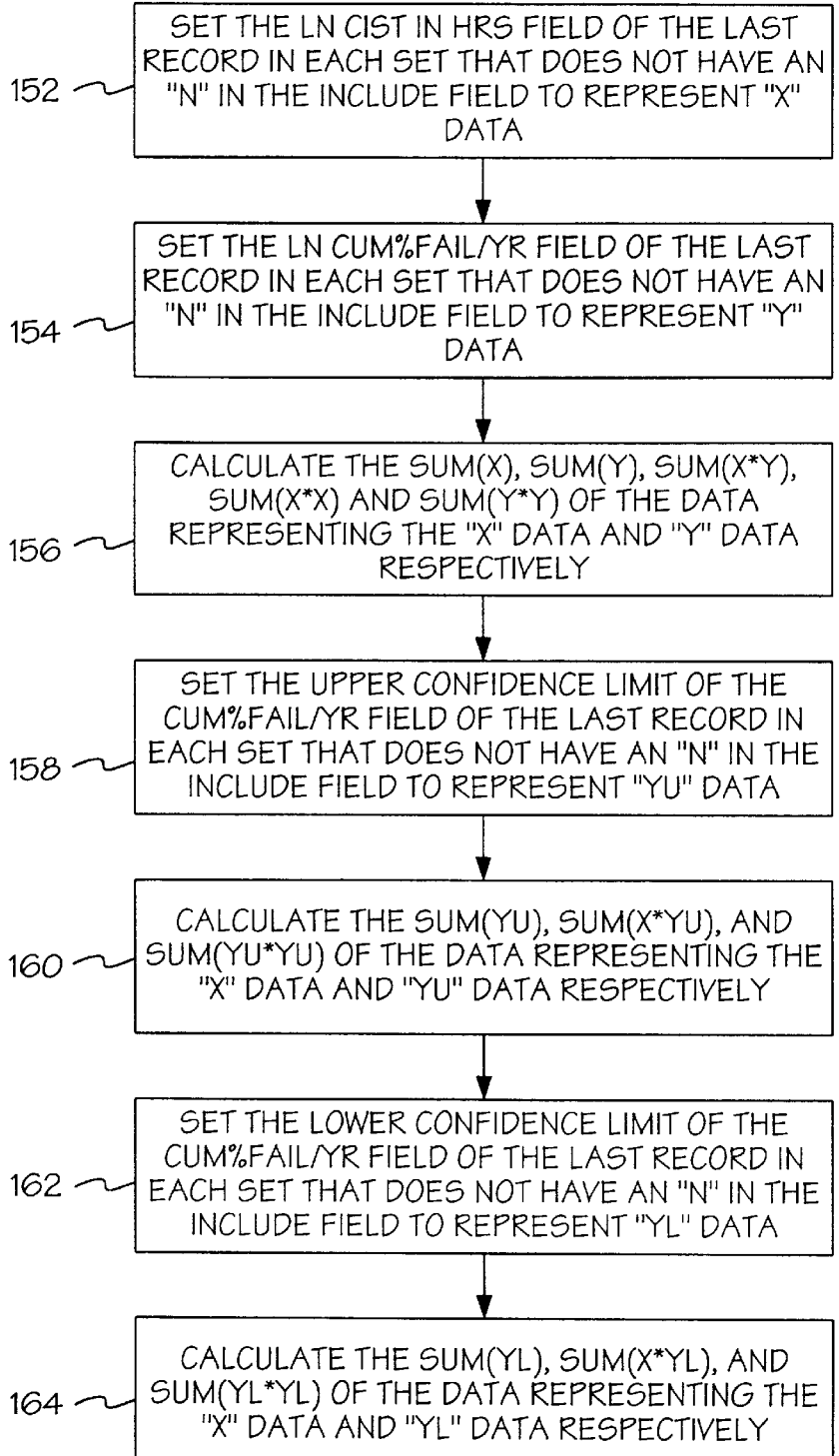
FIGS. 6a and 6b form a flowchart depicting a regression algorithm, according to the first embodiment of the invention.
Figure 6B:
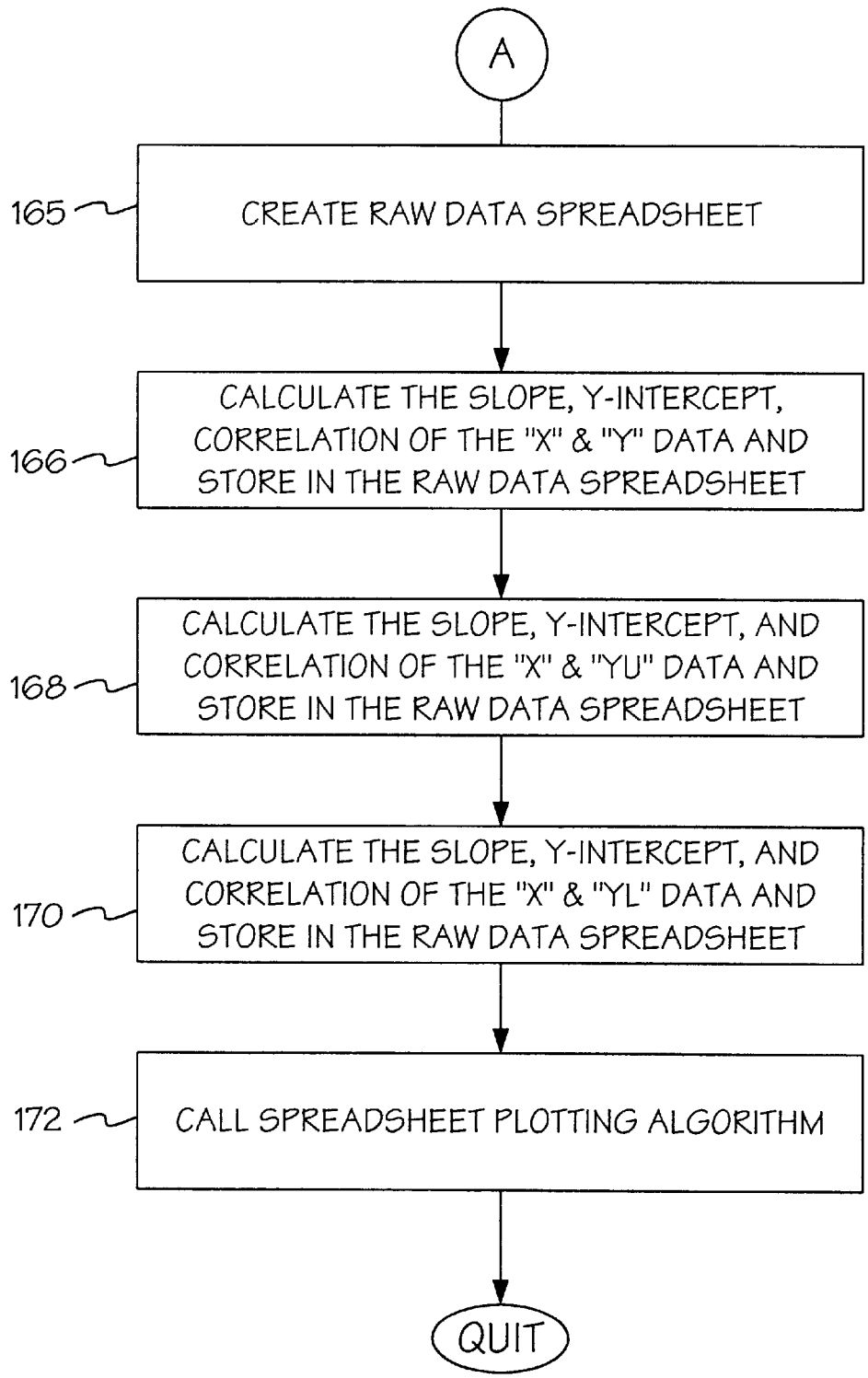

Referring to FIGS. 6a and 6b, the regression macro directs the computer to execute instructions according to a regression algorithm shown generally at 150. The regression algorithm calculates a slope, y-intercept and correlation coefficient of a best-fit curve applied to the contents of the ln(CIST,hrs) fields and the ln(cum%fail/yr) fields. Records may be selectively rejected from the calculations by entering "n" into the include fields 72 of records which are not to be included in the calculations.

The regression algorithm begins with block 152 which directs the computer to set the ln(CIST,hrs) field 58 of the last record in each set that does not have an "n" in the include field 72 or an empty ln(CIST,hrs) field 58, to represent an X data set. Block 154 directs the computer to set the ln(cum%fail/yr) field 66 of the last record in each set that does not have an "n" in the include field 72 or an empty ln(CIST,hrs) field 58, to represent a Y data set.

Block 156 then directs the computer to calculate the following conventional statistical values: sum (X), sum (Y), sum (X*Y), sum (X²) and sum (Y²).

Block 158 then directs the computer to set the confidence ln(cum%fail/yr)upper limit field 68 of the last record in each set that does not have an "n" in the include field 72 or an empty ln(CIST,hrs) field 58, to represent a YU data set. Block 160 then directs the computer to calculate the following conventional statistical values: sum (YU), sum (X*YU), and sum (YU²), based on the data contained in the X data set and YU data set.

Block 162 directs the computer to set the confidence ln(cum%fail/yr)lower limit field 70 of the last record in each set that does not have an "n" in the include field 72 or an empty ln(CIST,hrs) field 58, to represent a YL data set. Block 164 then directs the computer to calculate the following conventional statistical values: sum (YL), sum (X*YL), and sum (YL²), based on the data contained in the X data set and the YL data set.

Figure 7:
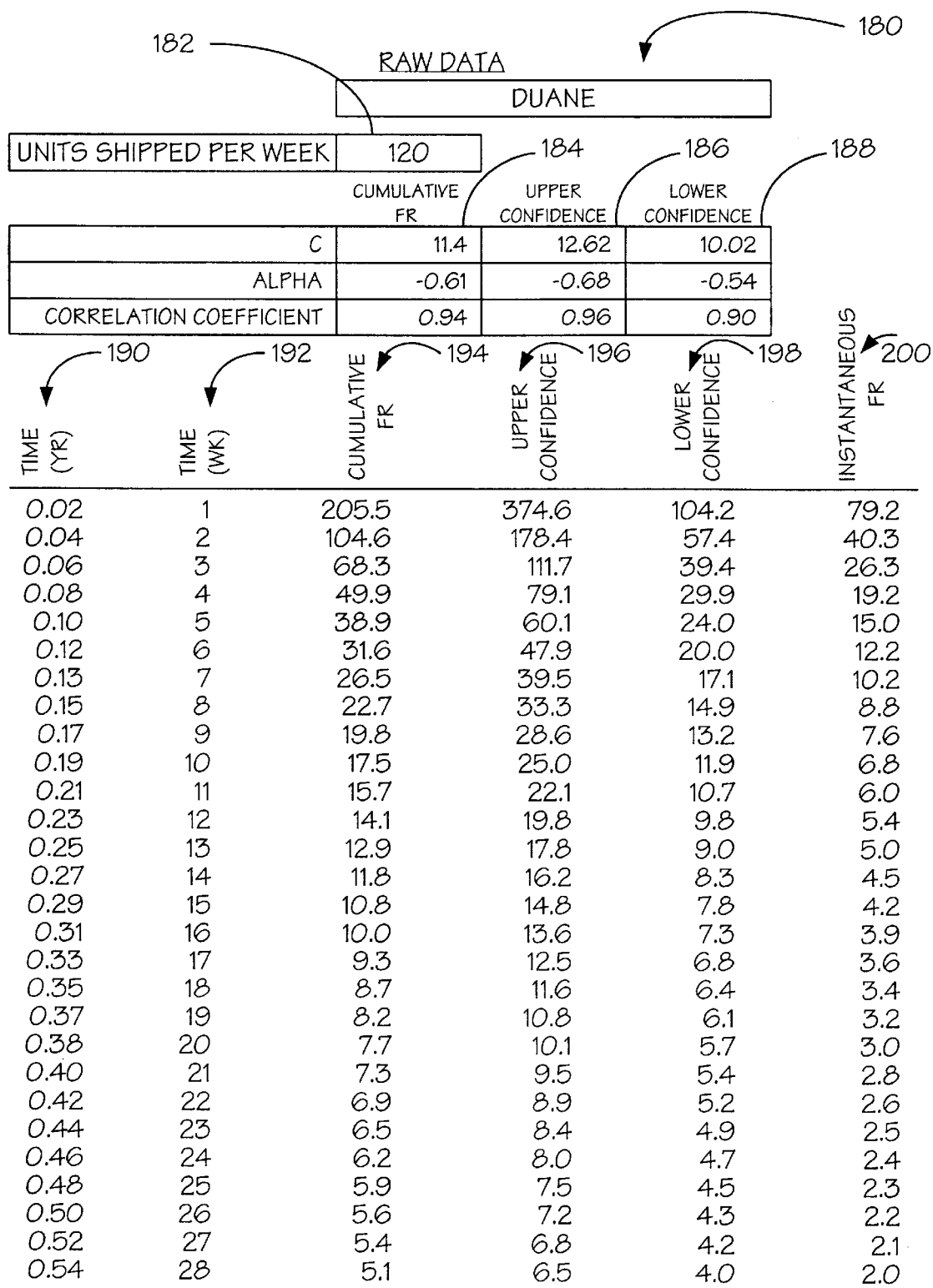
FIG. 7 is a depiction of a Raw Data spreadsheet, according to the first embodiment of the invention.

Referring to FIG. 6b, block 165 directs the computer to create a Raw Data spreadsheet shown generally at 180 in FIG. 7. The Raw Data spreadsheet includes a units shipped per week field 182, a slope, a y-intercept and a correlation coefficient field associated with a cumulative failure rate shown generally in column 184, a slope, a y-intercept and a correlation coefficient field associated with an upper confidence limit of the cumulative failure rate shown generally in column 186 and a slope, a y-intercept and a correlation coefficient field associated with a lower confidence limit of the cumulative failure rate shown generally in column 188.

The Raw Data spreadsheet further includes cells arranged in columns for storing data relating to values calculated according to a Duane model. The columns include a time(in years) column 190, a time(in weeks) column 192, a cumulative FR column 194, an upper confidence column 196, a lower confidence column 198 and an instantaneous failure rate (FR) column 200. The time(yr) column 190 contains predefined time values representing years stored in ascending order. The time(wk) column 192 contains values representing the equivalent in weeks, of the predefined time values associated with the time(yr) column 190. The remaining columns are initially blank until the computer is directed to place data in them.

Referring back to FIG. 6b, block 166 directs the computer to calculate the slope, the Y-intercept and the correlation coefficient of the X data set in relation to the Y data set, based on the values calculated in block 156, using conventional statistical equations. The computer is then directed to store the calculated values in column 184 of the Raw Data spreadsheet shown in FIG. 7, representing the slope, the Y-intercept, and the correlation coefficient, of the Cumulative Failure Rate, respectively.

Referring back to FIG. 6b, block 168 directs the computer to calculate the slope, the Y intercept and the correlation coefficient of the X data set in relation to the YU data set, based on the values calculated in Block 156 and Block 160, using conventional statistical functions. The computer is then directed to store the calculated values into column 186 of the Raw Data spreadsheet shown in FIG. 7, representing the slope, the Y-intercept, and the correlation coefficient, of the Upper Confidence level of the Cumulative Failure Rate, respectively.

Referring back to FIG. 6b, block 170 directs the computer to calculate the slope, Y-intercept, and the correlation coefficient of the X data set in relation to the YL data set based on the values calculated in Block 156 and Block 162 using conventional statistical functions. The computer is then directed to store the calculated values into column 188 of the Raw Data spreadsheet shown in FIG. 7, representing the slope, Y-intercept, and correlation coefficient, of the Lower Confidence of the Cumulative Failure Rate, respectively.

Referring back to FIG. 6b, block 172 then directs the computer to call a spreadsheet plotting algorithm.

Spreadsheet Plotting Algorithm

Figure 9:
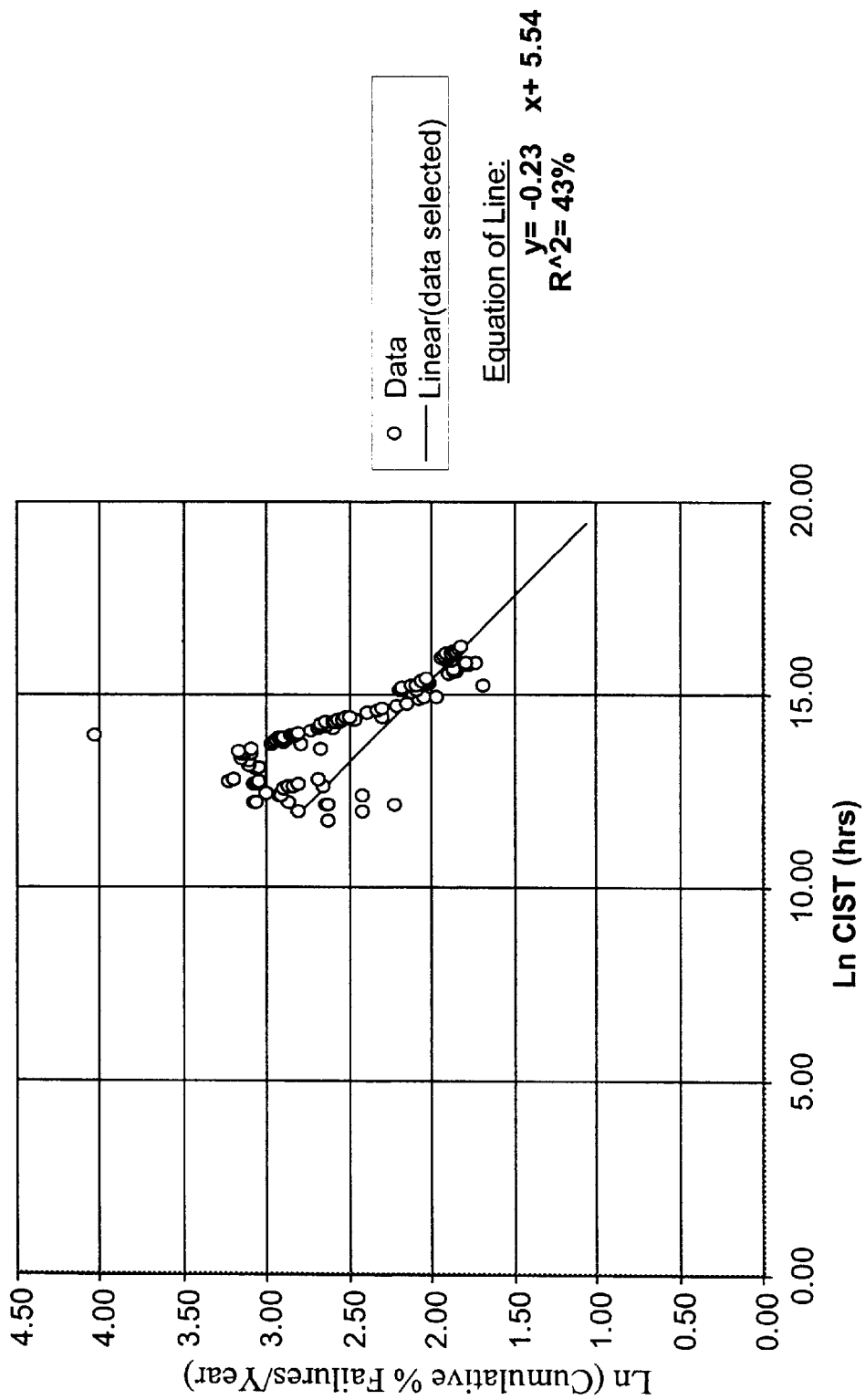
FIG. 9 is a ln—ln plot of ln(cum%fail/yr) versus time in weeks, according to the first embodiment of the invention.
Figure 10:
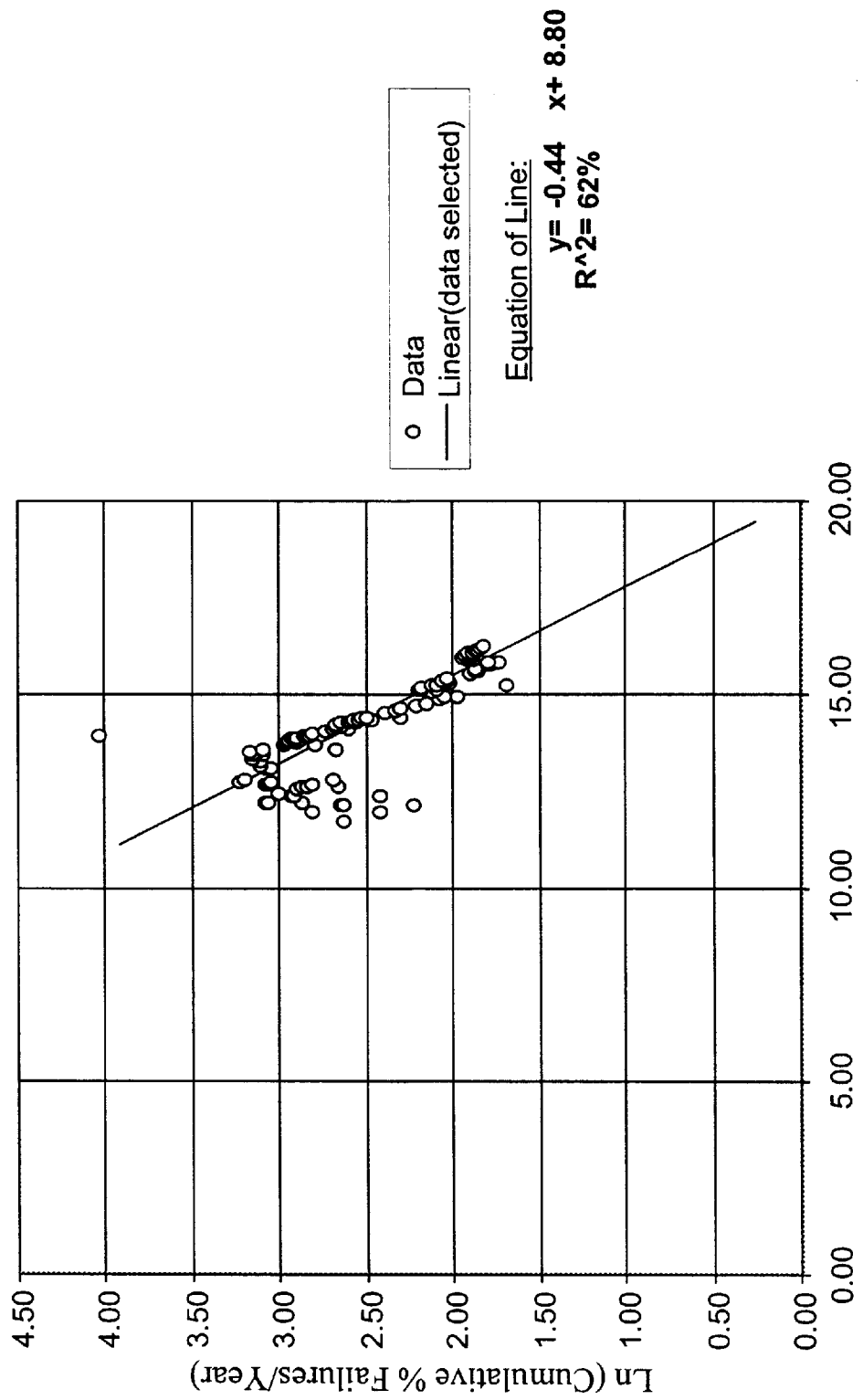
FIG. 10 is a ln—ln plot of ln(CIST,hrs) versus time in weeks according to a first embodiment of the invention.

The Spreadsheet plotting algorithm (not shown) includes instructions operable to invoke a plotting function available in the EXCEL program. A "view graphs" button icon is programmed to appear on the spreadsheet such that when the user actuates this icon, the CIST plotting algorithm directs the computer to perform a plotting function on the contents of the ln(cum%fail/yr) field 66 and the ln(CIST,hrs) field 58 versus time in weeks. Referring to FIG. 9 an example of a ln—ln plot of the ln(cum%fail/yr) versus time in weeks is shown generally at 260. Referring to FIG. 10, an example of a ln—ln plot of the ln(CIST,hrs) versus time in weeks is shown generally at 262.

Return Rate Algorithm

Figure 8:
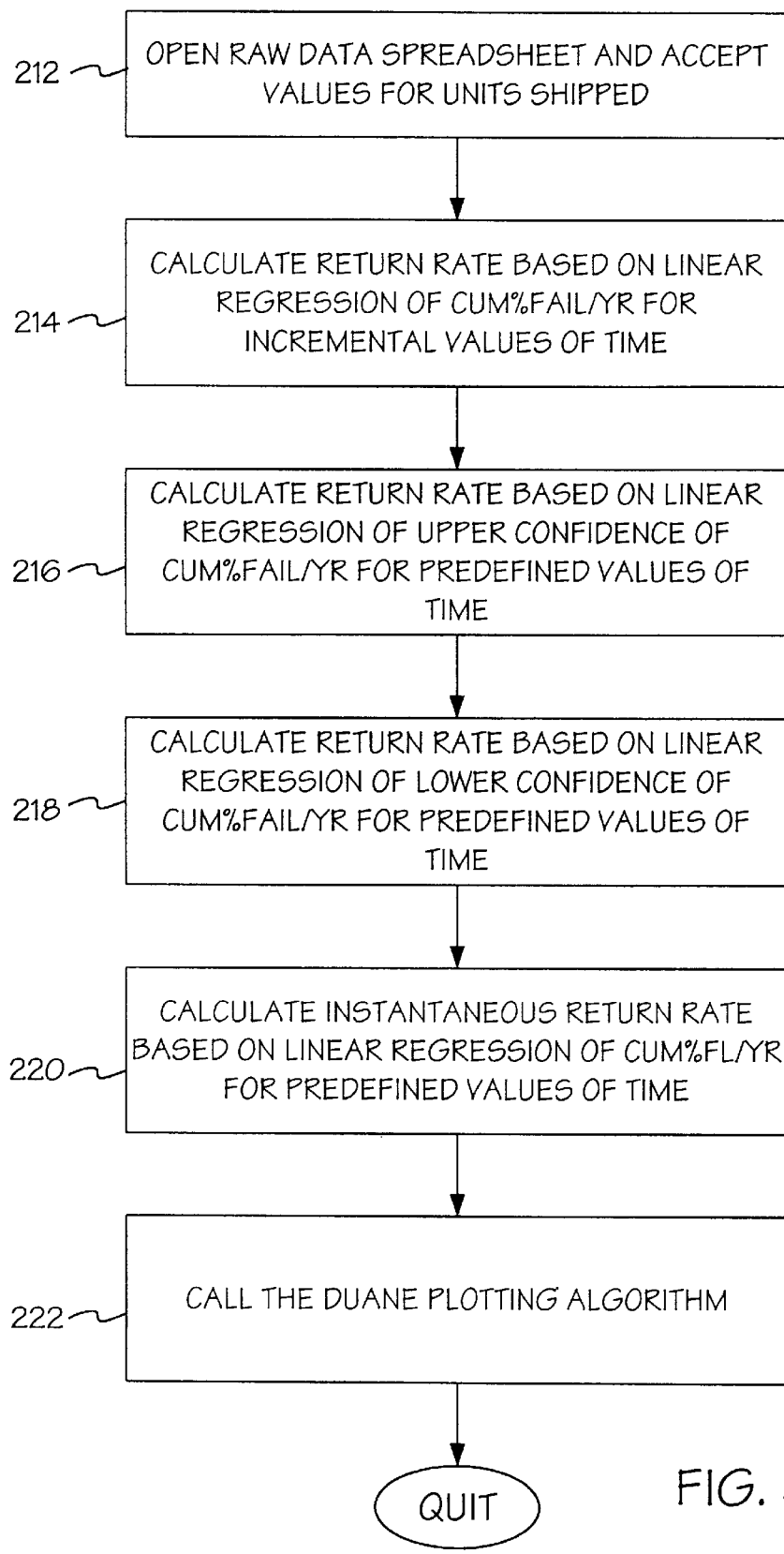
FIG. 8 is a flowchart depicting a return rate algorithm, according to the first embodiment of the invention.

A return rate button icon is programmed to appear on the spreadsheet such that when a user actuates this button, the return rate macro is run. Referring to FIG. 8, the return rate macro directs the computer to execute instructions according to a return rate algorithm shown generally at 210. The return rate algorithm begins with Block 212 which directs the computer to index the Raw Data spreadsheet shown in FIG. 7 and to accept a value for the units shipped per week field 182 from the user. After a value is entered, the computer is directed to Block 214 of FIG. 8.

Block 214 directs the computer to calculate the return rate based on the linear regression values calculated for the (cum%fail/yr) stored in column 184 of FIG. 7, for predefined values of time stored in the time(yr) column 190, according to the function:

$$RR = CT^{-\alpha}$$

Where:
 y=value stored in the units shipped cell
 t=time in years
 α=the growth rate (=slope of linear regression)
 C=a constant (=y-intercept of linear regression)
 RR=cumulative return rate in percent The return rate algorithm calculates a corresponding return rate for each time value in the time(yr) column 190. The return rates so calculated are then stored in cells in the cumulative FR column 194 in the same row as the time value associated with the calculation.

Referring back to FIG. 8, block 216 then directs the computer to calculate return rates based on linear regression values calculated for the upper confidence limit stored in column 186 of FIG. 7, for predefined values of time stored in the time(yr) column 190. Corresponding return rates are stored in cells in the upper confidence column 196 in the same row as the time value associated with the calculation.

Block 218 then directs the computer to calculate return rates based on linear regression values calculated for the lower confidence limit stored in column 188 of FIG. 7 for predefined values of time stored in the time(yr) column 190. Corresponding return rates are then stored in cells in the lower confidence column 198 in the same row as the time value associated with the calculation.

Referring back to FIG. 8, block 220 directs the computer to calculate the instantaneous return rate based on linear regression values calculated for the (cum%fail/yr) stored in column 184, shown in FIG. 7, for predefined values of time. The return rate algorithm calculates the return rate according to the following function:

$$RRi = C(1-\alpha)t^{-\alpha}$$

Where:
 y=value stored in the units shipped cell
 t=time in years
 α=the growth rate (=slope of linear regression)

C=a constant (=y-intercept of linear regression)
RRi=instantaneous return rate in percent The return rate algorithm calculates a corresponding instantaneous return rate for each "t" value stored in the time(yr) column 190. Corresponding return rates are then stored in cells in the instantaneous FR column 200 in the same row as the time value associated with the calculation.

Referring back to FIG. 8, block 222 directs the computer to call a Duane plotting algorithm (not shown) and then to exit the return rate algorithm.

Duane Plotting Algorithm

Figure 11:
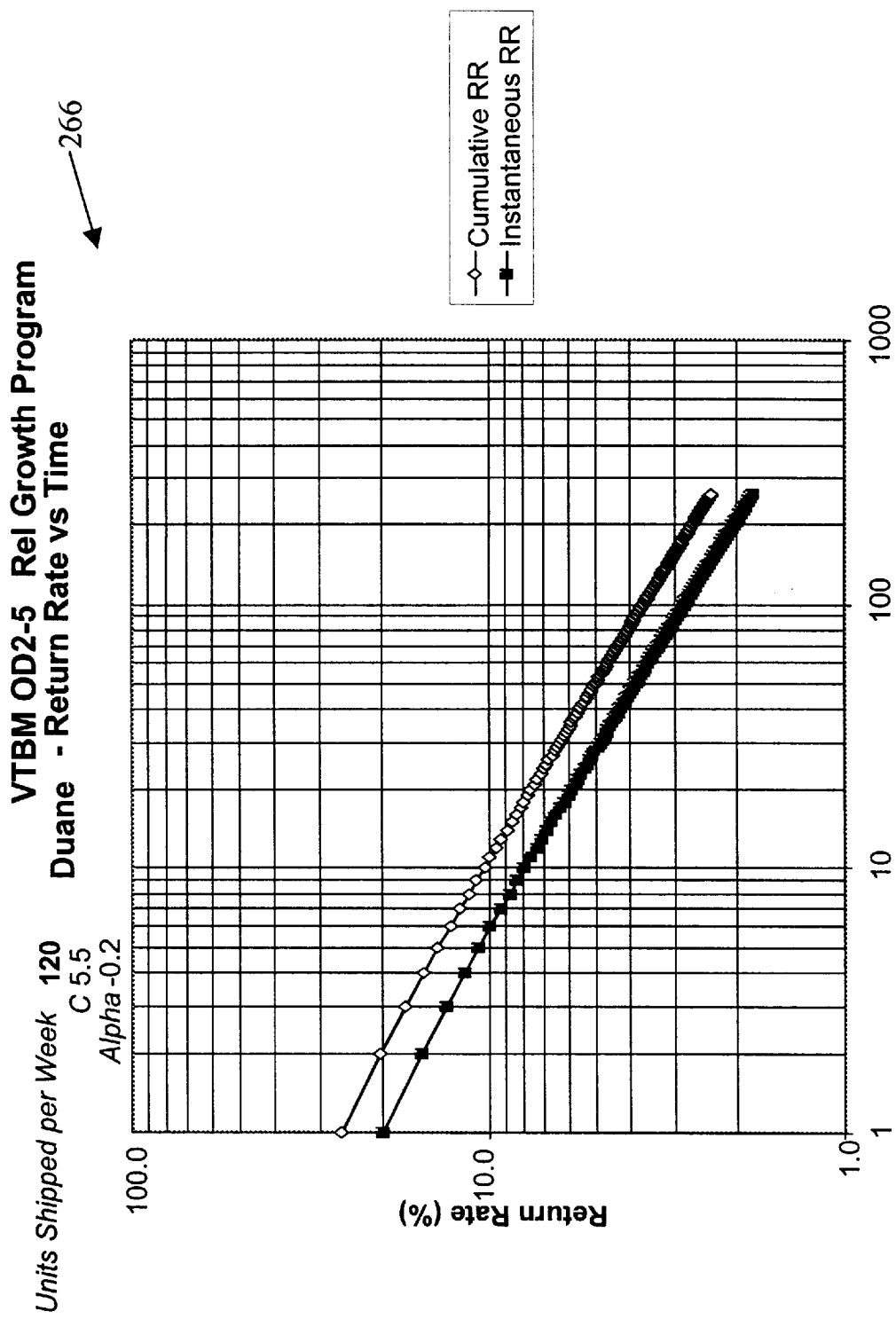
FIG. 11 is a ln—ln plot of cumulative and instantaneous return rate versus time in weeks, according to the first embodiment of the invention.

The Duane plotting algorithm includes instructions operable to invoke a plotting function available in the EXCEL program. A "view graphs" button icon is programmed to appear on the spreadsheet such that when the user selects this button, the Duane plotting algorithm directs the computer to generate various plots. The Duane plotting algorithm produces and displays a ln—ln plot of the data contained in the cumulative FR column 194 versus the data contained in the time(wk) column 192. Referring to FIG. 11 an example of a ln—ln plot of cumulative RR versus time in weeks is shown generally at 266. From this plot the user can predict the return rate at any desired time. For example, using the plot shown, the user may observe that after 50 weeks of shipping 120 units per week, a return rate of less than 3 percent will be achieved.

Figure 12:
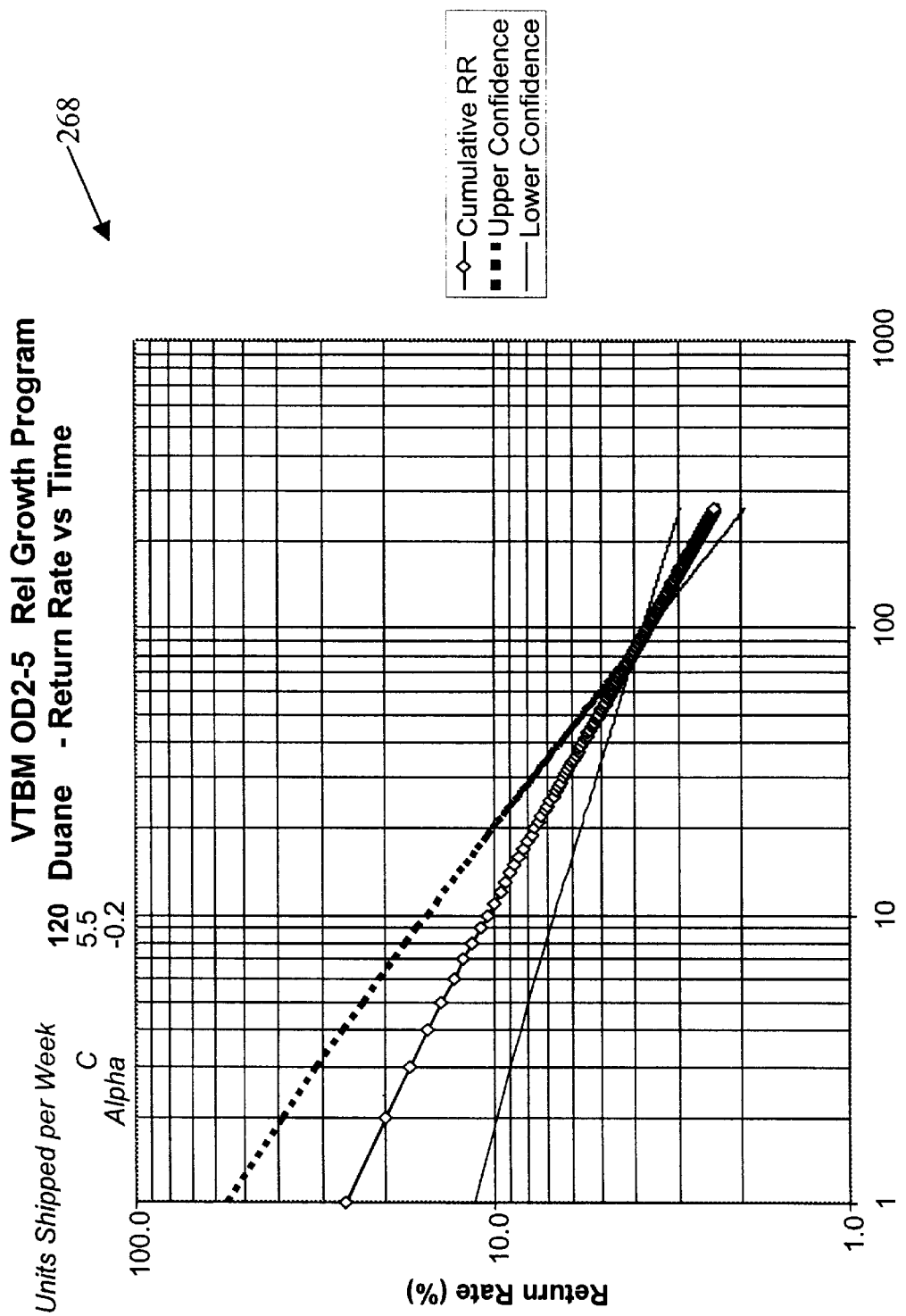
FIG. 12 is a ln—ln plot of upper and lower confidence limits and a cumulative return rate curve versus time in weeks, according to the first embodiment of the invention.

In addition, the plotting macro can also generate return rate curves for the data contained in the upper confidence column 196 and the data contained in the lower confidence column 198, and then plot this data along with the cumulative return rate curve to allow prediction of the return rate within a confidence range. Referring to FIG. 12, an example of a ln—ln plot of upper confidence, lower confidence and cumulative return rate curve versus time in weeks is shown generally at 268.

Alternatives

It will be appreciated that the Duane Model may be replaced with other models such as Lloyd-Lipow and Gompertz including the AMSAA model in which case the apparatus would include code for directing the processor to execute an AMSAA or other return rate calculation instead of the Duane Model calculation.

While specific embodiments of the invention have been described and illustrated, such embodiments should be considered illustrative of the invention only and not as limiting the invention as construed in accordance with the accompanying claims.

What is claimed is:

1. A computer-implemented method of determining a growth rate and a return rate in equipment, the method comprising:
   a) producing commissioning records having an equipment identifier field for identifying corresponding equipment placed in service, an in-service date field for indicating the date the equipment was placed in service and a number of units placed in service field for identifying the number of units of said equipment placed in service on said in-service date;
   b) producing failure records having an equipment identifier field for identifying equipment failed, a failure date field for identifying a date on which said equipment failed, an in-service date field for identifying the dare on which said equipment was placed in service and a number of units failed field for identifying the number of units of said equipment identified by said equipment identifier field which have failed;
   c) arranging said commissioning records and said failure records such that said commissioning records and said failure records are arranged in sets of records, said sets being in chronological order of in-service date:
   d) addressing each set of records successively and producing and adding a new record between consecutive sets of records when any record preceding a currently addressed set of records has a failure date between the in-service date of the currently addressed set and the in-service date of the next successive set, said new record including an in-service date field and a units failed field, said failure date of said any record preceding said currently addressed set of records being stored in the in-service date field of said new record and the contents of the units failed field of said any record preceding said currently addressed set of records being stored in the units failed field of said new record;
   e) producing and associating with each set of records a total units shipped value, a total units failed value, a cumulative units-in-field value, a cumulative units failed value, a cumulative in-service time value, a natural logarithm of cumulative in-service time value, a cumulative percent failures per year value, and a natural logarithm of cumulative percent failures per year value;
   f) calculating slope and intercept values of a best-fit curve applied to an X data set comprised of the natural logarithm of cumulative in-service time values of a last record in each set and a Y-data set comprised of the natural logarithm cumulative percent failures per year fields of each said last record in each set, said slope value representing said growth rate of said equipment; and
   g) employing said slope value representing said growth rate in a growth rate model to produce a return rate of said equipment.

2. A method as claimed in claim 1 wherein producing and associating a total units shipped value includes for each set of records, adding the contents of the number of units placed in service fields of each record to produce said total units shipped value and appending to said last record in said each set, a total units shipped field and storing said total units shipped value in said total units shipped field.

3. A method as claimed in claim 1 wherein producing and associating a total units failed value includes for each set of records, adding the contents of the number of units failed fields of each record in the set to produce said total units failed value and appending to a last record in said each set, a total units failed field and storing in said total units failed field said total units failed value.

4. A method as claimed in claim 2 wherein producing and associating a cumulative units-in-field value includes appending a cumulative units-in-field field to each said last record in each of said sets and subtracting the contents of the number of units failed field from the cumulative units-in-field field of the last record in an immediately preceding set, and adding the number of units placed in service to produce a cumulative units in service value for a currently addressed last record in a set.

5. A method as claimed in claim 3 wherein producing and associating a cumulative units failed value includes appending a cumulative units failed field to each said last record in each of said sets and adding the contents of the cumulative units failed field of the last record in an immediately preceding set to the contents of the number of units failed field to produce said cumulative units failed value and storing said cumulative units failed value in said cumulative units failed field of a currently addressed last record in a set.

6. A method as claimed in claim 5 wherein producing and associating a cumulative in-service time value includes for the last record in each set, appending a cumulative in-service time in days field and storing in said cumulative in-service time in days field said cumulative in service time value calculated as the sum of the product of the number of days between the contents of the in-service date field of the last record of a currently addressed set of records and the contents of the in-service date field of the last record in an immediately previously addressed set and the contents of the cumulative units in service field and the contents of the cumulative in-service time in days field of the last record of the immediately previously addressed set of records.

7. A method as claimed in claim 6 wherein producing and associating a cumulative in-service time value includes for the last record in each set, appending a cumulative in-service time in hours field, the contents of which are calculated as the product of the contents of the cumulative in-service time in days field of the same record and the number of hours in a day.

8. A method as claimed in claim 7 wherein producing and associating a natural logarithm of cumulative in-service time value includes for the last record in each set, appending a natural logarithm of cumulative in-service time in hours field, the contents of which are calculated as the natural logarithm of the contents of the cumulative in-service time in hours field.

9. A method as claimed in claim 8 wherein producing and associating a cumulative percent failures per year value includes for the last record in each set, appending a cumulative percent failures per year field, the contents of which are calculated as the quotient of the contents of the cumulative units failed field and the contents of the cumulative in-service time in hours field, multiplied by the number of hours per year and further multiplied by 100.

10. A method as claimed in claim 9 wherein producing and associating a natural logarithm of cumulative percent failures per year value includes for the last record in each set, appending a natural logarithm of cumulative percent failures per year field, the contents of which are calculated as the natural logarithm of the contents of the cumulative percent failures per year field.

11. A method as claimed in claim 1 further including appending an include field to said last record in each set, said include field being operable to store a pre-defined value indicating whether or not said last record is to be included in said calculation of said best fit curve.

12. A method as claimed in claim 1 further including calculating upper and lower confidence values for natural logarithm of cumulative percent failures per year values.

13. A method as claimed in claim 12 further including calculating respective slope and intercept values of best-fit curves applied to said upper and lower confidence values for natural logarithm of cumulative percent failures per year values to produce upper and lower confidence growth rate values respectively.

14. A computer-readable medium encoded with a computer program for directing a processor to determine a growth rate and a return rate in equipment, by:

a) producing commissioning records having an equipment identifier field for identifying corresponding equipment placed in service, an in-service date field for indicating the date the equipment was placed in service and a number of units placed in service field for identifying the number of units of said equipment placed in service on said in-service date;

b) producing failure records having an equipment identifier field for identifying equipment failed, a failure date field for identifying a date on which said equipment failed, an in-service date field for identifying the date on which said equipment was placed in service and a number of units failed field for identifying the number of units of said equipment identified by said equipment identifier field which have failed;

c) arranging said commissioning records and said failure records such that said commissioning records and said failure records are arranged in sets of records, said sets being in chronological order of in-service date;

d) addressing each set of records successively and producing and adding a new record between consecutive sets of records when any record preceding a currently addressed set of records has a failure date between the in-service date of the currently addressed set and the in-service date of the next successive set, said new record including an in-service date field and a units failed field, said failure date of said any record preceding said currently addressed set of records being stored in the in-service date field of said new record and the contents of the units failed field of said any record preceding said currently addressed set of records being stored in the units failed field of said new record;

e) producing and associating with each set of records a total units shipped value, a total units failed value, a cumulative units-in-field value, a cumulative units failed value, a cumulative in-service time value, a natural logarithm of cumulative in-service time value, a cumulative percent failures per year value, and a natural logarithm of cumulative percent failures per year value;

f) calculating slope and intercept values of a best-fit curve applied to an X data set comprised of the natural logarithm of cumulative in-service time values of a last record in each set and a Y-data set comprised of the natural logarithm cumulative percent failures per year fields of each said last record in each set, said slope value representing said growth rate of said equipment; and g) employing said slope value representing said growth rate in a growth rate model to produce a return rate of said equipment.

15. A computer-readable medium as claimed in claim 14 wherein producing and associating a total units shipped value includes for each set of records, adding the contents of the number of units placed in service fields of each record to produce said total units shipped value and appending to said last record in said each set, a total units shipped field and storing said total units shipped value in said total units shipped field.

16. A computer-readable medium as claimed in claim 14 wherein producing and associating a total units failed value includes for each set of records, adding the contents of the number of units failed fields of each record in the set to produce said total units failed value and appending to said last record in said each set, a total units failed field and storing in said total units failed field said total units failed value.

17. A computer-readable medium as claimed in claim 15 wherein producing and associating a cumulative units-in-field value includes appending a cumulative units-in-field field to each said last record in each of said sets and subtracting the contents of the number of units failed field from the cumulative units-in-field field of the last record in an immediately preceding set, and adding the number of units placed in service to produce a cumulative units in service value for a currently addressed last record in a set.

18. A computer-readable medium as claimed in claim 16 wherein producing and associating a cumulative units failed value includes appending a cumulative units failed field to each said last record in each of said sets and adding the contents of the cumulative units failed field of the last record in an immediately preceding set to the contents of the number of units failed field to produce said cumulative units failed value and storing said cumulative units failed value in said cumulative units failed field of a currently addressed last record in a set.

19. A computer-readable medium as claimed in claim 18 wherein producing and associating a cumulative in-service time value includes for the last record in each set, appending a cumulative in-service time in days field and storing in said cumulative in-service time in days field said cumulative in service time value calculated as the sum of the product of the number of days between the contents of the in-service date field of the last record of a currently addressed set of records and the contents of the in-service date field of the last record in an immediately previously addressed set and the contents of the cumulative units in service field and the contents of the cumulative in-service time in days field of the last record of the immediately previously addressed set of records.

20. A computer-readable medium as claimed in claim 19 wherein producing and associating a cumulative in-service time value includes for the last record in each set, appending a cumulative in-service time in hours field, the contents of which are calculated as the product of the contents of the cumulative in-service time in days field of the same record and the number of hours in a day.

21. A computer-readable medium as claimed in claim 20 wherein producing and associating a natural logarithm of cumulative in-service time value includes for the last record in each set, appending a natural logarithm of cumulative in-service time in hours field, the contents of which are calculated as the natural logarithm of the contents of the cumulative in-service time in hours field.

22. A computer-readable medium as claimed in claim 21 wherein producing and associating a cumulative percent failures per year value includes for the last record in each set, appending a cumulative percent failures per year field, the contents of which are calculated as the quotient of the contents of the cumulative units failed field and the contents of the cumulative in-service time in hours field, multiplied by the number of hours per year and further multiplied by 100.

23. A computer-readable medium as claimed in claim 22 wherein producing and associating a natural logarithm of cumulative percent failures per year value includes for the last record in each set, appending a natural logarithm of cumulative percent failures per year field, the contents of which are calculated as the natural logarithm of the contents of the cumulative percent failures per year field.

24. A computer-readable medium as claimed in claim 14 wherein said computer program further directs said processor to append an include field to said last record in each set, said include field being operable to store a pre-defined value indicating whether or not said last record is to be included in said calculation of said best fit curve.

25. A computer-readable medium as claimed in claim 14 wherein said computer program further directs said processor to calculate upper and lower confidence values for natural logarithm of cumulative percent failures per year values.

26. A computer-readable medium as claimed in claim 25 wherein said computer program further directs said processor to calculate respective slope and intercept values of best-fit curves applied to said upper and lower confidence values for natural logarithm of cumulative percent failures per year values to produce upper and lower confidence growth rate values respectively.

* * * * *